(12) United States Patent
Raines

(10) Patent No.: US 8,120,707 B2
(45) Date of Patent: Feb. 21, 2012

(54) UFD-ACCOMODATING MULTIMEDIA SYSTEM

(75) Inventor: Moshe Raines, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 1359 days.

(21) Appl. No.: 11/710,925

(22) Filed: Feb. 27, 2007

(65) Prior Publication Data

US 2007/0247551 A1  Oct. 25, 2007

Related U.S. Application Data

(60) Provisional application No. 60/745,195, filed on Apr. 20, 2006, provisional application No. 60/747,194, filed on May 14, 2006, provisional application No. 60/803,047, filed on May 24, 2006, provisional application No. 60/746,653, filed on May 8, 2006, provisional application No. 60/829,153, filed on Oct. 12, 2006.

(51) Int. Cl.
*H04N 5/445* (2006.01)

(52) U.S. Cl. ........ 348/563; 348/552; 348/564; 348/567; 348/588; 348/584

(58) Field of Classification Search .................. 348/563, 348/564, 552, 584, 588, 567; 725/40, 42
See application file for complete search history.

(56) References Cited

U.S. PATENT DOCUMENTS

| | | | |
|---|---|---|---|
| 6,073,201 A * | 6/2000 | Jolley et al. | |
| 6,775,715 B2 * | 8/2004 | Spitaels et al. | |
| 6,934,467 B1 * | 8/2005 | Herz | |
| 7,716,400 B2 | 5/2010 | Raines et al. | |
| 2001/0049826 A1 | 12/2001 | Wilf | |
| 2002/0180894 A1 | 12/2002 | Okajima et al. | |
| 2003/0023329 A1 | 1/2003 | Brooks, Jr. et al. | |
| 2003/0126593 A1 | 7/2003 | Mault | |

(Continued)

FOREIGN PATENT DOCUMENTS

EP  0 974 945 A2 *  1/2000

(Continued)

OTHER PUBLICATIONS

Chinese Second Official Action for Chinese Application No. 200780014150.6 (Nov. 11, 2010).

(Continued)

*Primary Examiner* — Jefferey Harold
*Assistant Examiner* — Jean W Desir
(74) *Attorney, Agent, or Firm* — Jenkins, Wilson, Taylor & Hunt, P.A.

(57) ABSTRACT

The present disclosure relates to display devices, external storage devices and methods of operating the same. In some embodiments, a display device that detects a coupling with an external media device is provided. Before device coupling, the display device displays a video signal from a first source. In response to the detected coupling, the display device may mix or superimpose a video signal received from the external storage device with the video signal from the first source. In some embodiments, a multi-mode external storage device that provides a file download mode, a video menu mode, and a content display mode is disclosed. The external storage device is operative to couple with different types of hosts via a multi-use device port. In response to a detected coupling with a host display device, the external storage device adopts the menu mode, which allows a user to select a given content item for display and/or playback.

10 Claims, 6 Drawing Sheets

U.S. PATENT DOCUMENTS

| | | | |
|---|---|---|---|
| 2003/0176935 A1 | 9/2003 | Lian et al. | |
| 2003/0179100 A1 | 9/2003 | Zustak et al. | |
| 2004/0056841 A1* | 3/2004 | Slotta | |
| 2004/0117442 A1 | 6/2004 | Thielen | |
| 2004/0143716 A1 | 7/2004 | Hong | |
| 2004/0182938 A1* | 9/2004 | Chen et al. | |
| 2005/0005045 A1* | 1/2005 | Kim et al. | |
| 2005/0108462 A1 | 5/2005 | Choi et al. | |
| 2005/0135792 A1* | 6/2005 | Han | |
| 2005/0227773 A1* | 10/2005 | Lu et al. | |
| 2006/0059520 A1* | 3/2006 | Miyazawa | 725/52 |
| 2006/0068729 A1* | 3/2006 | Yu et al. | |
| 2006/0131156 A1 | 6/2006 | Voelckers | |
| 2006/0146017 A1 | 7/2006 | Leung et al. | |
| 2006/0152484 A1 | 7/2006 | Rolus Borgward | |
| 2006/0294306 A1 | 12/2006 | Hong | |
| 2007/0250193 A1* | 10/2007 | Raines et al. | |
| 2007/0260808 A1* | 11/2007 | Raines et al. | |
| 2007/0263473 A1* | 11/2007 | Raines | |
| 2007/0273643 A1* | 11/2007 | Erez et al. | |
| 2008/0005424 A1* | 1/2008 | Raines et al. | |

FOREIGN PATENT DOCUMENTS

| | | |
|---|---|---|
| EP | 1 315 361 A1 * | 5/2003 |
| JP | EP1635354 | 8/2005 |
| TW | EP1583363 | 3/2004 |
| TW | M275468 | 9/2005 |
| TW | M280056 | 11/2005 |
| WO | WO 01/61974 A1 * | 8/2001 |
| WO | WO 2001/061932 A1 * | 8/2001 |
| WO | WO2005/069614 | 7/2005 |
| WO | WO 2005/124932 A2 * | 12/2005 |
| WO | WO 2006/073444 A1 * | 7/2006 |
| WO | WO 2007/122606 A1 * | 11/2007 |
| WO | WO 2007/122612 A1 * | 11/2007 |
| WO | WO 2007/129314 A1 * | 11/2007 |
| WO | WO 2007/132462 A1 * | 11/2007 |
| WO | WO 2007/135686 A3 * | 11/2007 |

OTHER PUBLICATIONS

Communication pursuant to Article 94(3) EPC for European application No. 07736326.5 (Nov. 3, 2010).
Taiwanese Official Action for Taiwanese Application No. 096116141 (Oct. 26, 2010).
Final Official Action for U.S. Appl. No. 11/716,648 (Oct. 7, 2010).
Chinese Official Action for Chinese Application No. 200780014150.6 (Mar. 1, 2010).
Official Action for U.S. Appl. No. 11/716,648 (Jan. 20, 2010).
Chinese Official Action for Chinese Application No. 200780014016.6 (Dec. 25, 2009).
Notice of Allowance and Fee(s) Due for U.S. Appl. No. 11/797,928 (Dec. 31, 2009).
Chinese Official Action for Chinese Application No. 200780017688.2 (Jun. 10, 2010).
Chinese Official Action for Chinese Application No. 200780020575.8 (Apr. 29, 2010).
Notice of Allowance and Fee(s) Due for U.S. Appl. No. 11/747,928 (Aug. 20, 2009).
Official Action for U.S. Appl. No. 11/747,928 (Jan. 26, 2009).
Notification of Transmittal of the International Search Report and the Written Opinion of the International Searching Authority, or the Declaration for International Application No. PCT/IL2007/000630 (Nov. 20, 2007).
Notification of Transmittal of the International Search Report and the Written Opinion of the International Searching Authority, or the Declaration for International Application No. PCT/IL2007/000586 (Oct. 16, 2007).
Notification of Transmittal of the International Search Report and the Written Opinion of the International Searching Authority, or the Declaration for International Application No. PCT/IL2007/000545 (Oct. 5, 2007).
Notification of Transmittal of the International Search Report and the Written Opinion of the International Searching Authority, or the Declaration for International Application No. PCT/IL2007/000493 (Sep. 28, 2007).
Notification of Transmittal of the International Search Report and the Written Opinion of the International Searching Authority, or the Declaration for International Application No. PCT/IL2007/000477 (Aug. 28, 2007).
Notice of Allowance for Taiwanese Patent Application No. 096116141 (May 31, 2011).
Non-Final Official Action for for U.S. Appl. No. 11/747,929 (Jun. 10, 2011).
Chinese grant notice for Chinese patent application No. 200780020575.8 (May 20, 2011).
Official Action for U.S. Appl. No. 11/710,988 (Feb. 2, 2011).

* cited by examiner

UFD-ACCOMODATING MULTIMEDIA SYSTEM

CROSS-REFERENCE TO RELATED APPLICATIONS

This patent application claims the benefit of the following patent applications: U.S. Provisional Patent Application No. 60/745,195 filed Apr. 20, 2006, U.S. Provisional Patent Application No. 60/747,194 filed May 14, 2006, U.S. Provisional Patent Application No. 60/803,047 filed May 24, 2006; U.S. Provisional Patent Application No. 60/746,653 filed May 8, 2006; and U.S. Provisional Patent Application 60/829,153 filed Oct. 12, 2006.

FIELD OF THE INVENTION

The present invention relates to display devices for displaying a mixed video signal and to multi-mode external storage devices operative to export a video signal to a display device.

BACKGROUND AND RELATED ART

In recent years, portable external storage devices such as portable external hard drives and USB flash drives (UFD devices) such as the Cruzer® flash drive from SanDisk Corporation (Milpitas, Calif.) have become extremely popular. One salient feature provided by many external storage devices is a relatively simplified user interface, which facilitates easy operation of the device. For example, many such storage devices lack a display screen or provide only a small display screen.

It is quite common for users to store 'viewable' content such as e-books or movie files on a USB flash drive. Whenever a user computer wishes to view stored content or to view a menu of content items, it is necessary for the user to obtain access to a microcomputer (for example, a laptop, desktop of personal digital assistance (PDA)) and to couple the external storage device to the microcomputer. The user then views the content or the menu on a display connected to the microcomputer. The menu is useful for selecting a content item for display (for example, using a keyboard or a mouse).

There are many situations where a user does not necessarily have access to a microcomputer (or does not necessarily wish to use an available computer), but nevertheless would like to view video media content, or to view listing of content items, for example, on a television, video camcorder, home cinema system, digital video projector, or any other media presentation device.

Thus, there is an ongoing need for devices, methods and systems which facilitate a viewing of content items, or a menu of content items, stored on an external storage device.

SUMMARY

The present inventor is now disclosing a host video display device operative to receive a video signal from an external storage device via a device port. Before coupling with the external storage device, the host video display device displays a video image or video stream from a given source of video (for example, from an internal RF receiver or a DVD device or a video player). In response to a detected coupling with the external storage device, the video display device simultaneously (i) continues to display the previously-displayed video image or video stream; and (ii) displays a video signal received from the external storage device. This may be accomplished by mixing the video signal from the 'given' or previous video source with the newly-received video signal from the external storage device—for example, overlaying the newly-received video signal over the previously-displayed video image or video stream, or by displaying both images in different regions of a 'split screen.'

In some embodiments, the external storage device is operative to export a 'menu' video signal listing one or more content items stored on the device or on a memory card connected to the external storage device. In some embodiments, the external storage device may have no screen or only limited display capabilities. Using the presently-disclosed host display device (for example, having a screen that is larger than the typically portable external storage device) it is possible, without 'completely' interrupting the screening of a previously displayed video image or video stream, to view a listing of one or more content items residing in or on the external storage device.

Thus, in some embodiments, the presently-disclosed host display device may be useful for facilitating a 'streamlined' user experience for easily viewing a menu of the external device and/or content items on the external device.

In one example, the external storage device is operative to handle user commands, for example, using buttons on the housing of the external storage device, or using one or more other techniques described below. This may be useful for 'browsing' a menu, or for 'browsing' a content item such as an e-book, or for 'play/stop/pause/fastforward' of a streamed content item such as a movie. It is noted that it is unnecessary for the host device to handle the commands and there is no need for the commands to be sent via the communication channel between the host display device and external storage device. Instead, in some embodiments, the external storage device may modify an exported video signal (i.e. displayed by the host display device) in response to commands handled by the external storage device.

In one example, a user is watching a television show or a movie on a television screen and does not wish for the program to be interrupted. Nevertheless, the user (or a different user) may wish to simultaneously view a listing or menu of different content items stored on an external storage device in a manner that minimally interrupts viewing of the current video image or screen. After viewing the listing or menu of different content items, the user selects (e.g. using controls of the external storage device) an item, and the external storage device exports, to the display device, a video signal (i.e. a video image or video stream) for the selected item. This 'content video signal' is then displayed on the display device.

It is noted that the presently disclosed video display device may be useful for situations where a computer is not available (or it is not desired to use the computer to view content on the media storage device), but a television or other display device (for example, including but not limited to a video camcorder, home cinema system, digital video projector, or any other media presentation device) is available. The user simply couples the media storage device to the display device (i.e. television), and, upon coupling, the display device exports a video signal indicative of content stored on the device (for example, a list or menu of content items), and this signal is superimposed with another input signal (for example, from an internal television receiver) for display on the screen.

Furthermore, the present inventor is now disclosing a novel multi-mode external storage device with a 'multi-use' device port. This device port may be coupled (i.e. either directly or via some sort of device cable or cradle) with host devices of different types. The external storage device behaves differently in accordance with a detected type of host device.

When coupled to a 'computer' (i.e. a desktop and/or laptop and/or PDA and/or cellular phone, having, for example, a standard USB interface), the external storage device may present, via the multi-use device port, a 'file system interface' to the computer (via, for example, a USB port of the computer) a feature that is also provided by standard UFDs. When coupled to the display device via the same device port used to coupled with the 'computer', the external display device is operative to generate a video signal indicative of content stored in or on the external device and to export the video signal for display.

In some embodiments, the external storage device detects a host type, and adopts a certain 'mode' in accordance with a detect type. In some embodiments, the external storage device provides at least three modes: a 'download' mode when coupled with a computer, a 'menu' mode when coupled with the display device, and a content presentation mode when coupled with a display device. In the latter two modes, the external storage device exports a video signal.

When in one 'menu' mode, the exported video signal is a 'menu video signal' that is an image of a listing of one or more content items (for example, files) stored within the external storage device or on a coupled memory card or USB flash drive (UFD). This listing may be, for example, an image of icons and/or an image of alpha-numeric symbols describing each individual content item. When the external storage device exports the content item listing video signal, it is thus said to be in 'menu' mode.

When in 'content presentation' mode, the exported video signal is a video image of at least a portion of a content item (e.g. an e-book or a MS Word file) or a streaming video signal for an item such as a movie.

When coupled to the 'computer' host, the device may behave like an 'ordinary' UFD and present a file system interface to the host computer. Thus, at this time the device may receive and store or 'download' one or more content items (for example files), and the device is said to be in 'download' mode. The content items may be received via the same 'multi-use' device port through which the video signal is exported when coupled to the display device host.

In some embodiments, the external storage device is operative to detect a host device upon coupling, and to automatically adopt the 'menu' mode if the external storage device detects coupling with a host display device. Thus, the external storage device is said to 'recognize' or 'accommodate' a display host device.

Once again, it is noted that this may be useful for situations where the external media device has only 'streamlined' functionality and has no screen or only limited display capabilities. Thus, in some embodiments, even though the presence of a computer may be required to upload files to the portable external storage device, it is, nevertheless, possible to utilize the display screen of the host display device, even in the absence of a computer, to view a listing of content items and/or view an actual content item (for example, an e-book or a movie video or even a Microsoft Word® file).

In some embodiments, the external storage device may be operative to receive electrical power from one or both of types of host device—the display device which receives a video signal and the 'computer' which communicates with the external storage using a protocol appropriate for transferring files. In some embodiments, the external storage device lacks an electrical power storage (for example, a disposable or re-chargable power), and is completely dependent upon electrical power received from a host device via the multi-use device port.

It is now disclosed for the first time a video display device including: a) a display screen; b) a host device port for receiving an external video signal from an external digital media playback device, c) a video mixer operative to produce a mixed video signal from a plurality of input video signals; d) a controller operative, in response to a detected coupling with the external digital media playback device, to configure the video mixer and the display screen such that: i) the plurality of input video signals includes the external video signal; and ii) the display screen displays the mixed video signal that includes the external video signal.

According to some embodiments, the host device port is configured to supply electrical power to the external digital media playback device.

According to some embodiments, the external video signal is an analog video signal.

According to some embodiments, the external video signal is a digital video signal.

According to some embodiments, the mixed video signal is an overlay video signal.

According to some embodiments, the mixed video signal is a split-screen video signal.

It is now disclosed for the first time a method of handling inter-device coupling with an external storage device by a display device, the method comprising: a) before the inter-device coupling, displaying a video signal from a first video source; b) detecting the inter-device coupling with the external storage device; c) in response to the detecting, mixing a video signal received from the external storage device with the video signal from the first video source; and d) displaying the mixed video signal on a screen of the display device.

According to some embodiments, the mixed video signal is an overlay video signal.

According to some embodiments, the mixed video signal is a split-screen video signal.

It is now disclosed for the first time a multi-mode external storage device comprising: a) a non-volatile memory for storing at least one digital media content item; b) a multi-use device port for inter-device coupling; c) a data controller for: i) receiving at least one digital media content item via the device port; and ii) writing the received at least one content item to the non-volatile memory, when the external digital media device is in a download mode; d) a video generation element operative to: i) generate a video menu signal for a plurality of the digital media content items stored in the non-volatile memory and to export the video menu signal via the multi-use device port when the external media device is in a menu mode; ii) generate a video content signal for at least one digital media content item and to export the generated video content signal from the external storage device via the multi-use device port when the external media device is in a content-presentation mode; and e) a host device type detector operative to detect a host device type upon the inter-device coupling via the device port, wherein the external digital media playback device is operative, in response to a display device detection by the host device type detector, to adopt the menu mode.

According to some embodiments, the external storage device includes only a single device port, the single device port being the multi-use device port.

According to some embodiments, i) the video content signal is a streaming video signal; and ii) the video generation element is operative to effect a media playback of at least one stored digital media content item to generate the video streaming signal when the external digital media device is in the content presentation mode.

According to some embodiments, i) the multi-use device port is further operative to receive from the display device at least one input media streaming signal selected from the group consisting of a video input media streaming signal and an audio input media streaming signal, and ii) the external storage device further comprises: a digital media recording application operative to record at least one received input media streaming signal to generate at least one of stored digital audio media and stored digital video media.

According to some embodiments, the device further includes further includes: f) a user-command handler operative to handle user commands, wherein one received command is operative to effect: i) selecting a digital media content item from a plurality of the digital media content items for display; and ii) a mode transition from the menu mode to the content-presentation mode.

According to some embodiments, the device further includes: a user-command input separate from the multi-use device port for receiving the user commands.

According to some embodiments, the device is operative to receive electrical power via the multi-use device port.

According to some embodiments, a power-dependence of the external storage device on the received electrical power via the multi-use device port is complete.

According to some embodiments, at least one video signal selected from the group consisting of the video content signal and the video menu signal is an analog video signal.

According to some embodiments, at least one video signal selected from the group consisting of the video content signal and the video menu signal is a digital video signal.

These and further embodiments will be apparent from the detailed description and examples that follow.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed display device, storage device, and methods of operating the same is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Figure 1A:
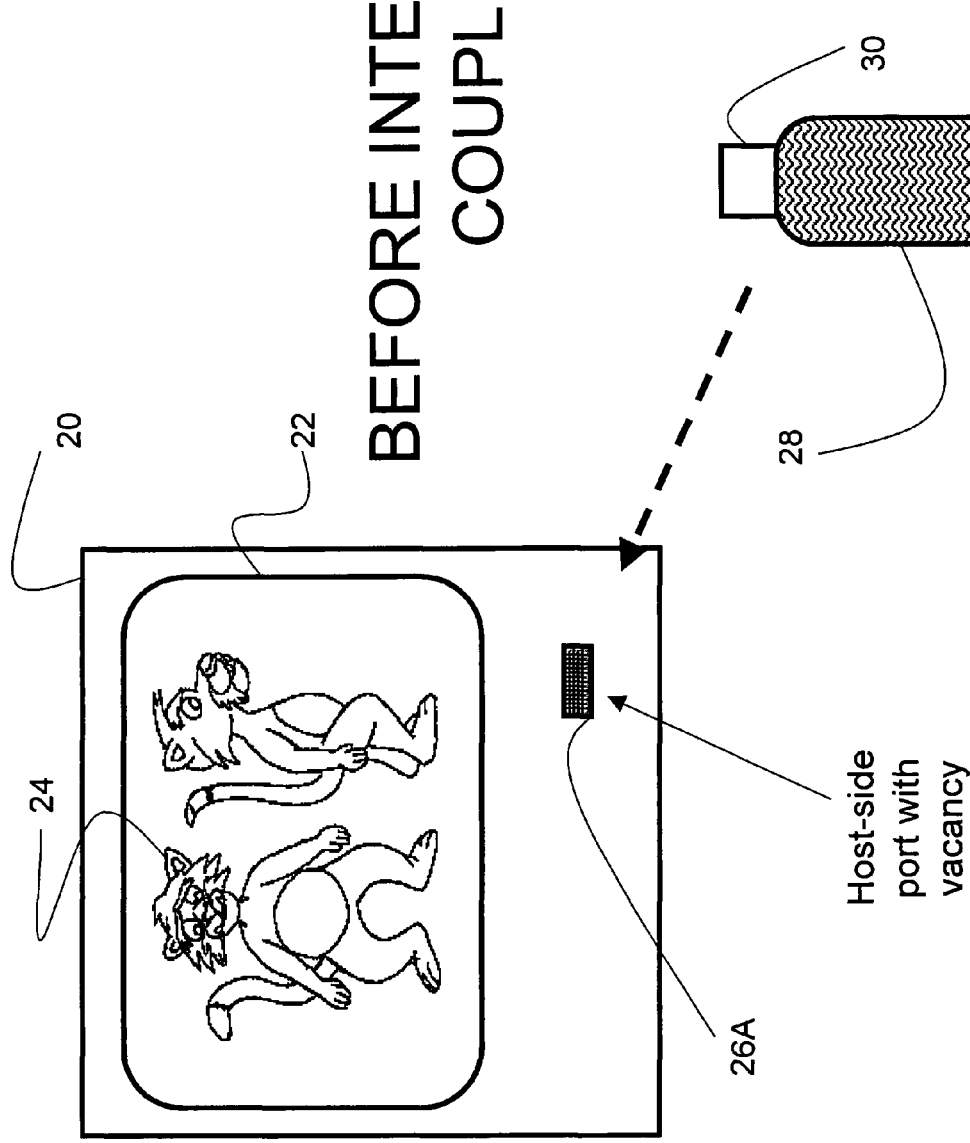
FIG. 1A provides an illustration of an exemplary display device including a device port operative to receive an external media device, in accordance with some embodiments of the present invention.

FIG. 1A shows an exemplary video system comprising a 'video display device 20 and an external storage device 28. The host video display device shown in the example of FIG. 1A is a TV set 20. Video display device 20 includes the screen 22, on which different video images 24 can be viewed. In addition, video display device 20 includes a host-side port 26A for example, a socket such as a USB socket, or a plug mechanically integrated with housing of video display device 20.

In the example of FIG. 1A, the host port 26 of video display device 20 is shaped to accommodate device port 30 of external storage device 28, for example a plug or mating connector such as a USB plug. In the example of FIG. 1A, the external storage device 28 is connected 'directly' with the host display device 20—plug 30 is directed mated or inserted into socket 26 of the host display device, and there is no external cable or cradle. Nevertheless, this is not a limitation and embodiments where the external storage device 28 is connected via a cable or cradle are also appropriate.

Figure 1B:
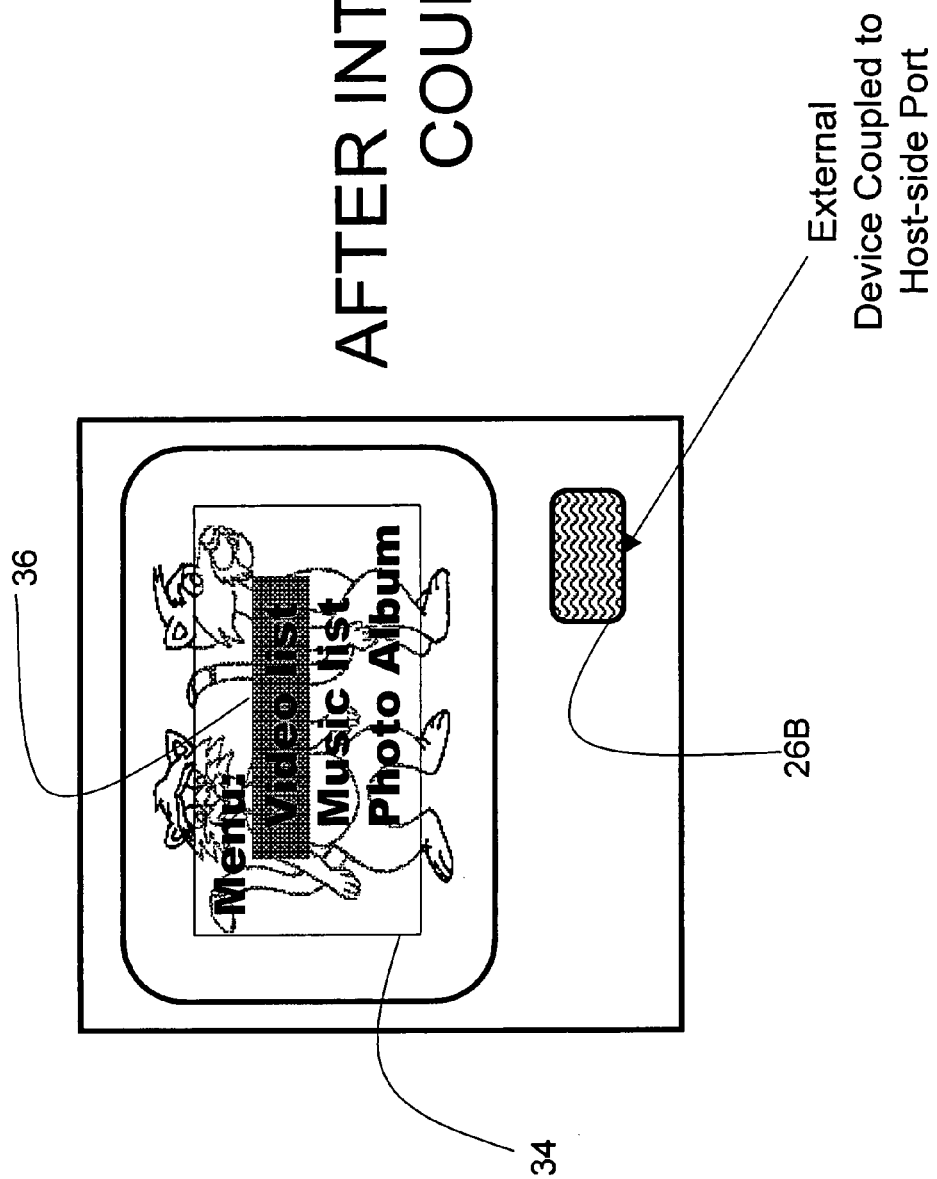
FIG. 1B provides an illustration of a system comprising an host display device coupled with an external storage device, where the host display device displays an overlay mixed video signal, in accordance with some embodiments of the present invention.

FIG. 1A illustrates the display device 20 before coupling with the external storage device 28—i.e. there is a host-side port with a vacancy. FIG. 1B illustrates the same display device 20 after inter-device coupling with the media storage device 28. In the example of FIG. 1B, after the external storage device 28 is coupled, device port 26B is now occupied by the external storage device 28.

Once connected, external storage device 28 recognizes that it is inserted into the video display device. In response to a detected coupling, external storage device 28 executes a program, similar to the programs used in "plug & play" sequences. In particular, the external storage device 28 begins to export, via device port 30, a video signal (for example, an analog or a digital video signal) indicative of a listing of files or content items stored in non-volatile memory. The content items may be stored either onboard non-volatile flash storage of external storage device 28 or in a memory card or UFD connected to the external storage device 28.

In order to generate the aforementioned video signal, the external storage device 28 includes a module for generating video, for example, including functionality similar to a video card of a desktop or laptop computer. The generated video signal is exported to display device 20 via respective ports 26 and 30, and is received and displayed by display device 20.

In the example of FIG. 1A, the display device 20 is displaying an 'original' video image or stream 24 from a given video source (for example, a television receiver) before coupling with the device. As shown in FIG. 1B, in response to a detected coupling with the external storage device 28, display device 20 continues to display the video signal (i.e. image or stream) from the given video source, and also simultaneously displays the video signal received from external storage device 28—i.e. display device 20 mixes the exported signal from the external storage device 28 with the first video signal from the 'pre-existing' video source. Thus, it is noted that in the present example, display device 20 also includes 'plug-and-play' capabilities, as will be described below, with reference to FIG. 3.

Display device 20 is said to 'accommodate' the external storage device 28 because display device 20 recognizes the coupling of external storage device 28 and gives the external storage device 28 initial at least partial 'control' over what is displayed on screen 22. Furthermore, the system comprising display device 20 and external storage device 28 is said to perform an 'On Screen Display' technique which provides a viewer (e.g. a TV viewer) with digital information by displaying the information on the screen simultaneously with a previously display video image or video screen (e.g. by overlay or displaying in different locations of screen 22).

In the shown embodiment, the mixed signal is the pop-up-menu 34 overlaid on the original video signal 24. It is appreciated that image overlaying (i.e. as illustrated in FIG. 1B) is not the only technique for mixing or superimposing two video signals, and that other techniques, for example, a split screen technique, are also appropriate.

In some embodiments, the external storage device 28 can receive and handle user commands, for example, from buttons on the housing of external storage device 28, or from an IR 'remote control,' or using a 'joystick' technique as described below. Thus, it is noted that pop-up-menu 34 may contain different data and information derived from the content of the external storage device. Upon receiving user browsing or selection commands, the video image generated and exported by external storage device 28 changes in response to the commands (for example, 'scroll-up' or 'scroll down' commands). This enables the user to conveniently control and browse the content of the external storage device.

In the example shown in FIG. 1B, the pop-up-menu includes three lines, one of which 36 is highlighted to designate the selected menu item for execution.

It is noted that the listing of content or files in FIG. 1B is carried out by exporting an 'alphanumerical' video signal. Nevertheless, other visual representation schemes are also possible, for example, including but not limited to a 'graphical icon' scheme for representing individual content items.

As shown in FIG. 1A, host-side port 26 of display device is mechanically integrated with a housing of display device 20—this may be either on the surface of a convex portion of the housing, or on a surface of device housing within at a concave portion of the surface of device housing—for example, in a cavity. Nonetheless, in both cases, external storage device 28 effects an inter-device communication with display device, and is considered an 'external' device.

Figure 2:
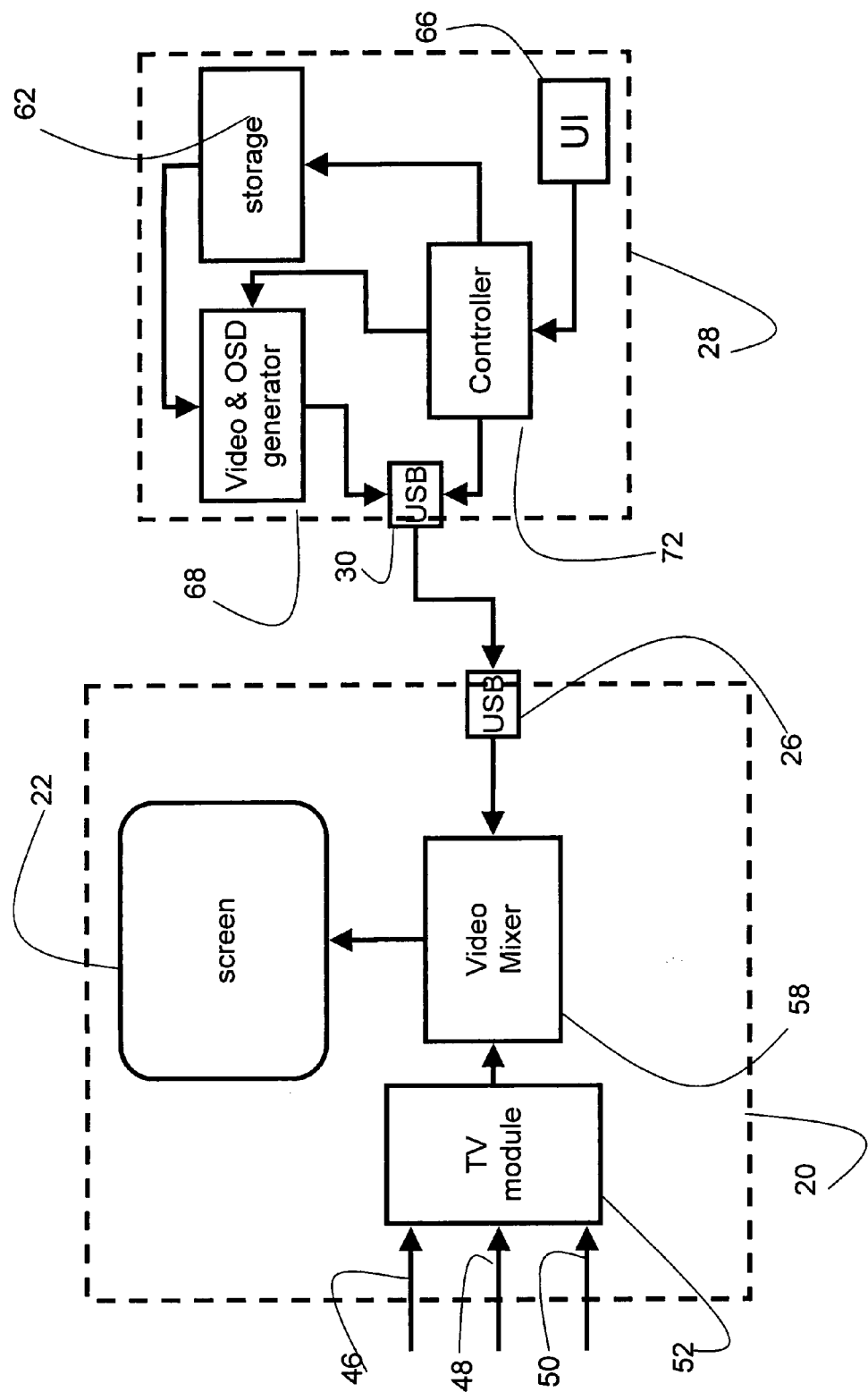
FIG. 2 provides a block diagram of system comprising an exemplary host display device coupled with an external storage device, in accordance with some embodiments of the present invention.

FIG. 2 shows a block diagram of media viewing system including external storage device 28 and display device 20 according to some embodiments of the present invention.

The video display device 20 includes a screen 22, a video selection module 52 that accepts the various sources of video 46, 48, 50, such as tuner output, converter output, or DVD output, and selects the one to serve as the AV signal for display. The AV signal is then fed into a video mixer module 58 that is capable of superimposing two video signals on top of each other. This video mixer also accepts a video signal via the USB connector 26 if an external storage device 28 is plugged in and is active.

For the particular example of FIG. 2, once the external storage device 28 is connected into the USB connector 26 by means of its device port (in this case mating USB connector 30), the external storage device recognizes the video display device. Such recognition is known in the art of USB devices, and is implemented in any personal computer that responds to the insertion of a UFD in its USB port. Upon such recognition, the external storage device automatically generates a pop-up menu, derived from the content stored in its memory section 62. This pop-up menu is generated by the Video-and-OSD generator 68 (or video generation element). The video generator 68 may carry out video-generating operations similar to those carried out by a traditional graphics card of a laptop or desktop.

The output of this Video-and-OSD generator is fed via the UFD connector 30 that has, in addition to the standard USB pins, additional pins for video communication with the video display device. These additional pins are not in use when the UFD is connected to a standard USB socket, as in a computer, but are in contact with mating pins in the special UFD socket in the video display device. The video display device recognizes that an active external storage device is present. The video display device then superimposes the signal from the external storage device on the selected AV signal and presents a menu on top of the current video played.

It is noted that any element in FIG. 2, or described in the present disclosure, may be implemented in any combination of software and hardware.

In some embodiments, video generator 68 is operative to generate a 'static' video image—for example an image of an electronic book or a visual image of portion of an open MS-Word® file. Alternatively or additionally, video generator 68 includes a playback application, as described below.

The external storage device is also operative to accept user commands, as shown in the user interface (UI) module 66, that is transferring the user commands to the 'command handler' (not shown—this may reside, for example, in controller 72) of the external storage device controller 72. A discussion of exemplary user input devices for generating the user commands is provided below. In the illustrated example, the external storage device controller is responsible for coordinating and controlling the different modules of the external storage device.

The pop-up menu generated is then fed via the USB connector to the video display device video mixer 58.

The interaction of the user with the menu on the screen is typically based on visual feedback from the screen and the use of an input device, including but not limited to a joystick, a button, and a remote controller. The controller interprets the user's intention by combining the commands from the input device with the image sent to the video display device for display.

It is noted that the video signal may either be an analog signal such as the video or audio signals received on ordinary television sets (i.e. via so-called banana cables) or received via an S-video socket. In yet another embodiment, the media stream is a digital signal, including but not limited to an uncompressed digital media signal, for example, using the HDMI standard.

Input of User Commands

The operation of the external storage device 28 can be controlled by a user using one or more of the following:

1) On-board controls such as:
   A) Buttons or other mechanical controls provided on the device 28;
   B) A joy stick functionality of the external storage device 28, as described in U.S. Provisional Patent Application 60/803,047. Thus, in some embodiments, the external storage device 28 playback device includes one or more mechanical sensors residing on a housing of the external storage device 28 for sensing a force or stress on the housing of the portable media playback device. One or more media playback commands may be provided in response to the sensed forces, thereby allowing a user to control operation of the player by providing force on the coupled media playback device.
2) A remote control, as described in U.S. Provisional Patent Application 60/746,653. Thus, in some examples, the portable media playback device is operative to receive user-generated commands from a remote control via a wireless link.

It is noted that, in the above 'remote control' example, the wireless link is separate from the communications link/data channel between the device port 30 of external storage device 28 and the host-side port 26 of the host display device 20. Thus, in some embodiments, the user command is received via a communications link (for example, the aforementioned wireless link) that is separate from device port 30.

One common feature to the 'remote control' example (example 2) and the 'on-board control' example (example 1) is that in both cases, the user commands are not received via the communications link/data channel between the device port 30 of external storage device 28. Thus, in both example, the command input is said to be 'separate' from the device port 30, and there is no need for the command to come from the host device and traverse the device port 30.

It is appreciated that the aforementioned list includes examples of user controls and is not intended as a comprehensive list.

These aforementioned user controls may be used for inputting to the device 'media playback commands' including but not limited to 'play'; 'stop'; 'pause'; 'next track'; 'select item', etc.

Feedback for controlling the player may be displayed on screen 22 of the display device.

Playback Features

In some embodiments, one or more digital media items such as movies are stored within external storage device 28 (or in a memory card or UFD coupled to a port of external storage device 28). Thus, in some embodiments, external storage device includes playback application (not shown) which may be implemented as any combination of hardware, software and firmware. In one example, the playback application includes computer code executed by a CPU (not shown) using volatile memory (not shown) for storing software variables.

The playback application is operative to export a streaming signal via device port 30 to display device 20.

Furthermore, it is noted that in some embodiments, the external storage device may also contain a recording application (not shown) for recording a video and/or audio stream received by device port 30 from display device 20.

Thus, some embodiments, device 100 includes a CODEC (not shown) (such as Vaddis 888, available from Zoran, see also http://www.zoran.com/Vaddis-R-888) which is used by (or part of) playback application and/or recording application. In playback mode, the digital multimedia content stored on either the internal storage or the external storage (for example, a memory card or a UFD), and transfers it to the CODEC. The CODEC translates the digital stream into viewable Audio/Video signals (i.e. media streaming signals) fed into the appropriate pins of device port 30, for displaying on the presentation display device 20.

In some embodiments, playback application (for example, using the CODEC) decodes the stored digital media and generates a decoded media streaming signal (i.e. which may be exported via device port 28). Similarly, in some embodiments, recording application (for example, using the CODEC) may encode a received media streaming signal.

Plug-and-Play Routine Carried Out by Display Device 20

Figure 3:
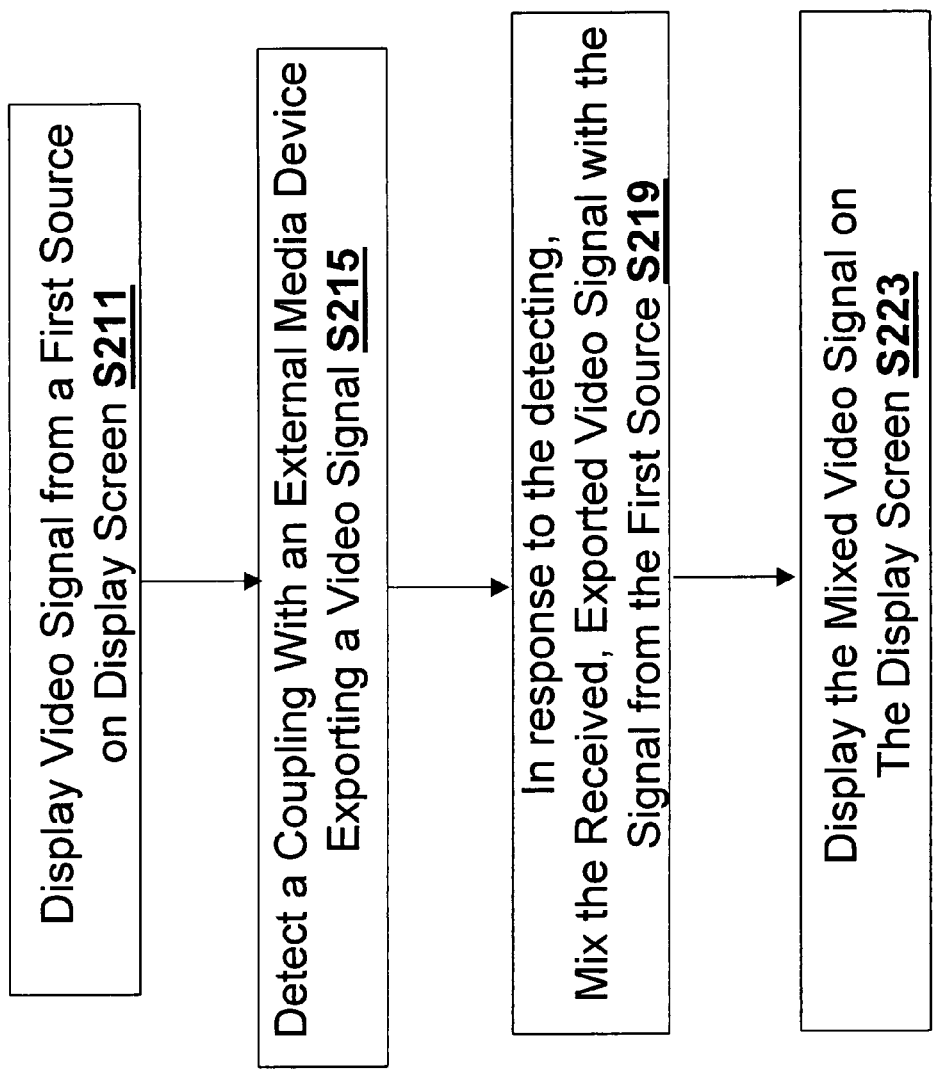
FIG. 3 provides a flow chart of a process whereby a host display device recognizes and accommodates an external storage device exporting a video signal in accordance with some embodiments of the present invention.

FIG. 3 provides a flow chart of a plug-and-play routine for displaying video received from external media device 28 that is effected by display device 20.

Before device coupling, display device 20 displays 211 a video signal from a first video source on display screen (for example, see 24 of FIG. 1A). When the external storage device 28 is coupled to the display device 20, this coupling is detected S215 by display device. In response to the detecting, the received video signal (for example, a video menu signal) is mixed S219 with the signal from first video source (i.e. previously displayed in S211) to form a mixed video signal, which is displayed S223 (i.e. by the electronics and/or software of display device 20 and without any requirement for further user commands).

Thus, the technique described in FIG. 3 may be useful for viewing a menu video signal, or any other video signal from external storage device 28, without interrupting a screening of video from a 'first video source' (i.e. the source whose video is 'previously' displayed before coupling with the external storage device 28).

Loading Digital Media onto the Device 28 from a Personal Computer

Figure 4:
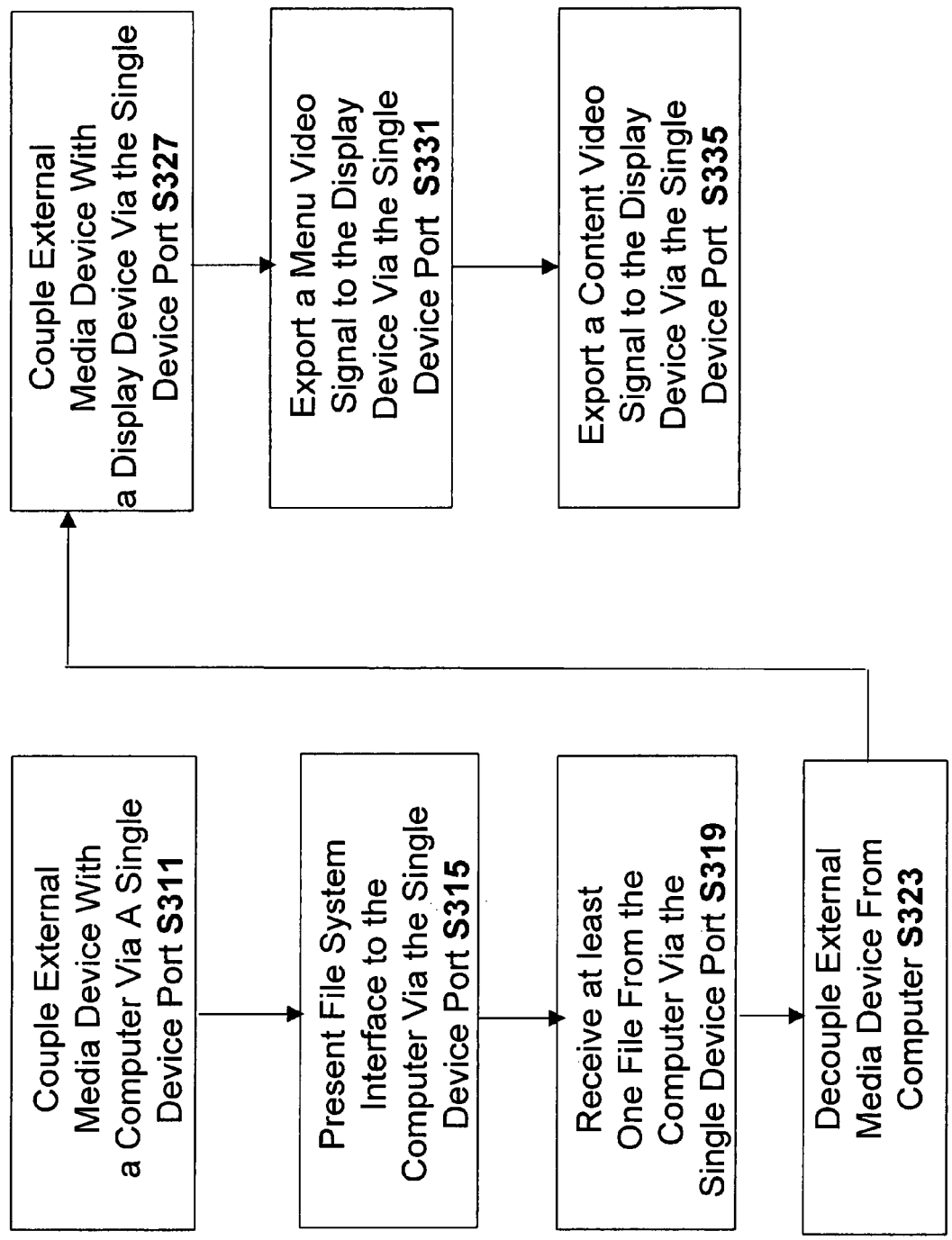
FIG. 4 provides a flow chart of an exemplary process whereby content is downloaded to an external storage device and then display on an external storage device in accordance with some embodiments of the present invention.

FIG. 4 provides a flow chart of an exemplary technique where one or more digital content items are loaded onto the external storage device 30 from a computer (i.e. a laptop, desktop, tablet, or PDA—the 'first host'), and then a menu video signal describing the content items on the external storage device 30 is exported to a display device (i.e. the 'second' host).

In the example of FIG. 4, the external storage device is first coupled with the computer or 'first host' via a given device port S311. Upon coupling, the external storage device presents a file system or file storage interface to the host computer device (for example, using controller 72). In particular, non-volatile storage 62 (or other storage connected to the external media device 30) may be presented S315 to the host computer as a block memory device by controller 72, as is commonly done by USB flash drives (UFD devices) such as the such as the Cruzer® flash drive from SanDisk Corporation (Milpitas, Calif.).

In step S319, at least one file is received from the computer and stored in internal memory non-volatile storage 62. In step S323, the external media device is decoupled from the computer (i.e. the 'first host').

In step S327, the external media device is coupled to the display device 20, and in step S331 the display device generates a video menu signal and exports the video menu signal to display device S20. If the user selects a video item for display (for example, a media file such as a movie, or an e-book or MS-word® file), a video display signal for the selected item is generated and exported S335 to display device 20 for display. In some examples, for example if a movie is selected, a playback of digital media may be effected and a streaming video signal may be exported.

One salient feature provided by some embodiments of the present invention is using the same device port to communicate with the 'first host' (i.e. the computer—which is coupled to the external media device in step S311) as the second host (i.e. display device 20 which is coupled to the external media device in step S327). Towards this end, it may be advantageous for the external multi-media device to 'recognize' the host device to which it is coupled.

Thus, in some embodiments, device port 30 is a so-called 'dual mode digital multimedia connector' as described in U.S. Provisional Patent Application 60/747,194. Thus, in some embodiments, storage device 28 is able to recognize a host device type—for example, to determine whether the host device is (i) a video display device 20 or (ii) a 'computer' host (for example, a laptop or desktop) operative to upload one or more files to storage device 28.

Thus, in some embodiments, storage device 28 includes a 'host-type recognition element' (not shown) for example, residing at least in part within device port 104. The host-type recognition element may include any combination of electronics, mechanical elements, and software. Thus in some embodiments, the media player 100 selects a data communication protocol (for example, effect a decision to communicate using a USB protocol or to export a media stream) in response to a detected host-device type.

In some embodiments, the host-type recognition element may be at least in part mechanical, for example, including a switch whose configuration is determined by a geometry of host-side port. According to this example, the device port 30 is dimensioned to mate with a host-side port of either host-device type; nevertheless, the actual shape of the host-side ports of the different devices differs so that, upon mating with device port 30, a switch associated with device port 30 adopts a first configuration for the case of the first host type, and a second configuration for the case of the second host type.

Alternatively or additionally, in another example, the host-type recognition element may recognize a voltage or status of a pin of a host-side port 26.

In some embodiments, the device includes only a single port 30 (i.e. the device lacks sockets or slots for memory cards or memory UFDs or other external storage) through which: I) digital media content is received from a personal computer and II) a media stream is exported for presentation on video host device 20. Nevertheless, this is not a requirement, and not a limitation.

Although not an explicit requirement, in some embodiments, because a single port may be used both to receive one or more files and to export a video signal, there is no need for additional ports, and the device only has a single port 28. This may be useful for providing a more streamlined device interface.

An Exemplary Plug-and-Play Routine Carried Out by External Media Device 28

Figure 5:
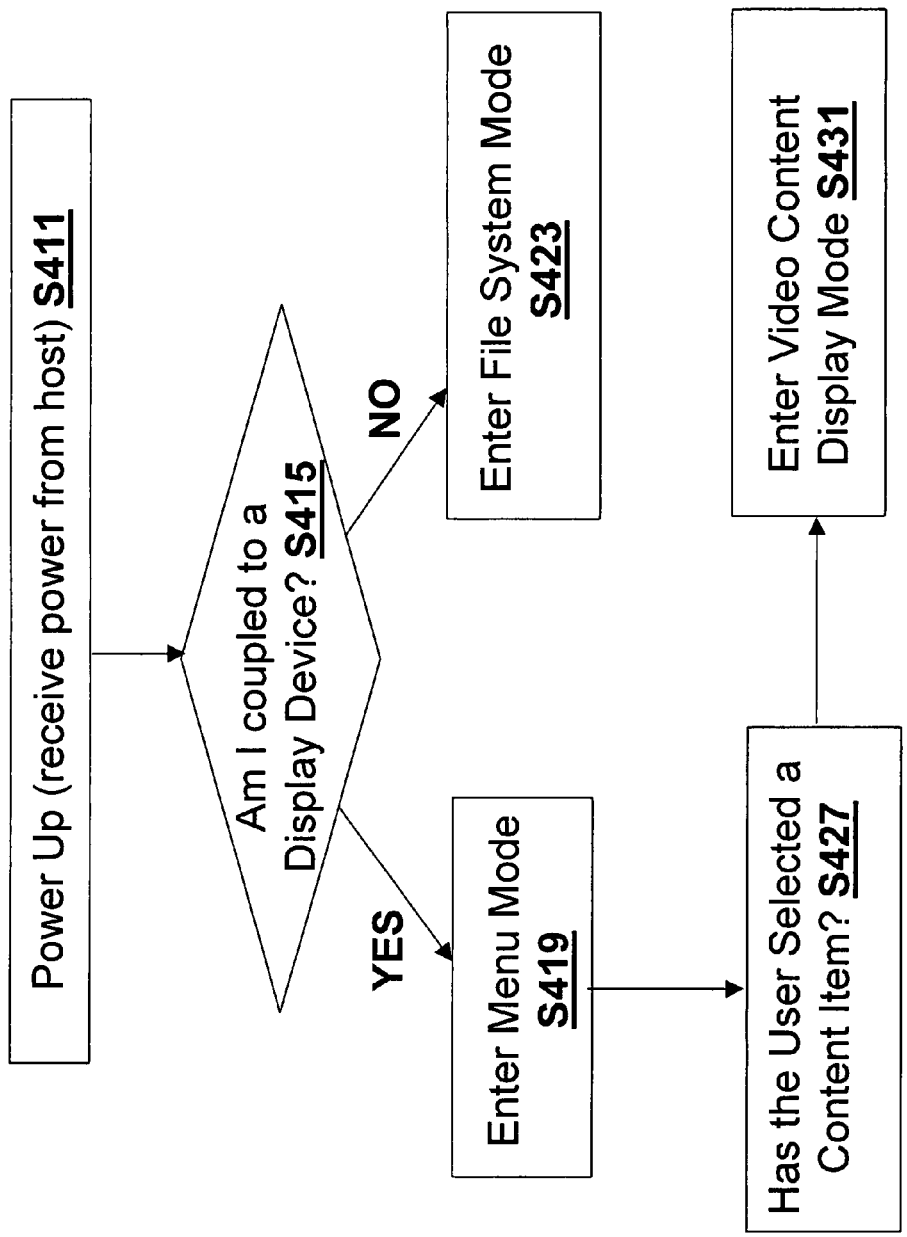
FIG. 5 provides flow chart of an exemplary process whereby an external storage device detects a host device type and adopts a mode in accordance with the sensed host device type in accordance with some embodiments of the present invention.

FIG. 5 provides a flow chart of an exemplary plug-and-play routine carried out by external media device in accordance with some embodiments of the present invention.

In step S411, when the external media device 28 is coupled to a host device (i.e. either display device 20 or a computer device—i.e. the 'first' host), power is received from the host device, and the external media device 28 powers up S411. Upon power-up, a mechanical and/or electric detection S415 is carried out to determine if the external media device 28 is coupled to a computer (for example, using one or more techniques described in U.S. Provisional Patent Application 60/747,194) or display device 20. In the event that external media device 28 is coupled to the computer device, a file system interface S423 to on-board 'internal' non-volatile memory (or other non-volatile memory such as a memory card or a UFD) is presented to the host computer via device port 30.

When the external media device 28 is in 'file system mode,' one possibility is that the external media device 28 may receive one or more files from the host computer (i.e. the 'first' host). When the external media device 28 receives the file from the host computer and writes the received file to internal non-volatile storage 62, external media device 28 is said to be in 'download mode.'

Alternatively, if it is determined that external media device 28 is coupled to a host display device, the external media device 28 enters S419 'menu' mode where a video signal indicative of a listing of content items or files (and/or categories for content items or file such as file folders) is exported via device port 30 (for example, a video signal of pop-up menu 36 as shown in FIG. 1B).

When the user selects a content item S427, the external media device 28 enters video content display mode S431 and begins to export a signal indicative of one or more content items (for example, including but not limited to a video streaming signal for a movie, or an image of at least a portion of an e-book or MS-word® file).

Additional Discussion

In some embodiments, in order to provide a more simplified device and/or interface, the external storage device 28 lacks certain elements, including one or more of: a screen for viewing played back content, a speaker for listening to playback content, a microphone for recording sounds, and a camera.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A multi-mode external storage device comprising:
   a) a non-volatile memory for storing at least one digital media content item;
   b) a multi-use device port for inter-device coupling;
   c) a data controller for:
      i) receiving at least one said digital media content item via said device port; and
      ii) writing said received at least one content item to said nonvolatile memory, when the external digital media device is in a download mode;
   d) a video generation element operative to:
      i) generate a video menu signal for a plurality of said digital media content items stored in said non-volatile memory and to export said video menu signal via said multi-use device port when the external media device is in a menu mode;
      ii) generate a video content signal for at least one said digital media content item and to export said generated video content signal from the external storage device via said multi-use device port when the external media device is in a content-presentation mode; and
   e) a host device type detector operative to detect a host device type upon said inter-device coupling via said device port, wherein the external digital media playback device is operative, in response to a display device detection by said host device type detector, to adopt said menu mode.

2. The external storage device of claim 1 wherein the external storage device includes only a single device port, said single device port being said multi-use device port.

3. The external storage device of claim 1 wherein:
   i) said video content signal is a streaming video signal; and
   ii) said video generation element is operative to effect a media playback of at least one said stored digital media content item to generate said video streaming signal when the external digital media device is in said content presentation mode.

4. The external storage device of claim 1 wherein:
   i) said multi-use device port is further operative to receive from said display device at least one input media streaming signal selected from the group consisting of a video input media streaming signal and an audio input media streaming signal, and
   ii) the external storage device further comprises:
      a digital media recording application operative to record at least one said received input media streaming signal to generate at least one of stored digital audio media and stored digital video media.

5. The external storage device of claim 1 further comprising:
   f) a user-command handler operative to handle user commands, wherein one said received command is operative to effect:
      i) selecting a digital media content item from a plurality of said digital media content items for display; and
      ii) a mode transition from said menu mode to said content-presentation mode.

6. The external storage device of claim 5 further comprising:
   g) a user-command input separate from said multi-use device port for receiving said user commands.

7. The external storage device of claim 1 wherein the device is operative to receive electrical power via said multi-use device port.

8. The external storage device of claim 7 wherein a power-dependence of the external storage device on said received electrical power via said multi-use device port is complete.

9. The external storage device of claim 1 wherein at least one video signal selected from the group consisting of said video content signal and said video menu signal is an analog video signal.

10. The external storage device of claim 1 wherein at least one video signal selected from the group consisting of said video content signal and said video menu signal is a digital video signal.

* * * * *